(12) United States Patent
Dieterle et al.

(10) Patent No.: US 10,054,035 B2
(45) Date of Patent: Aug. 21, 2018

(54) INTER COOLER

(71) Applicant: Mahle International GmbH, Stuttgart (DE)

(72) Inventors: Stefan Dieterle, Esslingen (DE); Thomas Strauss, Notzingen (DE); Christian Wagner, Stuttgart (DE)

(73) Assignee: Mahle International GmbH (DE)

( * ) Notice: Subject to any disclaimer, the term of this patent is extended or adjusted under 35 U.S.C. 154(b) by 104 days.

(21) Appl. No.: 15/159,497

(22) Filed: May 19, 2016

(65) Prior Publication Data

US 2016/0341107 A1 Nov. 24, 2016

(30) Foreign Application Priority Data

May 20, 2015 (DE) ........................ 10 2015 209 210

(51) Int. Cl.
*F02B 29/04* (2006.01)
*F28F 9/02* (2006.01)
(Continued)

(52) U.S. Cl.
CPC ........ *F02B 29/0468* (2013.01); *B01D 53/261* (2013.01); *F02B 29/0475* (2013.01); *F02M 25/028* (2013.01); *F28F 9/0234* (2013.01); *F28F 17/005* (2013.01); *B01D 2253/106* (2013.01); *B01D 2253/108* (2013.01); *F28D 1/05366* (2013.01); *F28D 2021/0082* (2013.01); *F28F 2275/00* (2013.01);
(Continued)

(58) Field of Classification Search
CPC .............. F02B 29/0468; F02B 29/0475; F28F 2275/00; F28F 9/0234; F28F 17/005; F28F 2275/08; B01D 53/261; B01D 2253/106; B01D 2253/108; F02M 25/028; Y02T 10/121; Y02T 10/146; F28D 2021/0082; F28D 1/05366
USPC ........... 60/598, 599, 600; 123/542, 540, 563
See application file for complete search history.

(56) References Cited

U.S. PATENT DOCUMENTS 5,183,017 A * 2/1993 Bopp ..................... F02M 35/08
123/198 D
6,394,076 B1 5/2002 Hudelson
(Continued)

FOREIGN PATENT DOCUMENTS

DE 3601391 A1 2/1987
DE 20121112 U1 4/2003
(Continued)

OTHER PUBLICATIONS

European Search Report for European Application No. 16168158.0 dated September 26, 2016.
(Continued)

*Primary Examiner* — Hoang Nguyen
(74) *Attorney, Agent, or Firm* — Fishman Stewart PLLC

(57) ABSTRACT

An intercooler may include an air outlet tank, at least one condensate collector for collecting at least one of condensate, which is separated in the intercooler, and moisture, and a drying agent arranged in the at least one condensate collector. The at least one condensate collector may be arranged in a region of the intercooler accessible to a charge air flow. The drying agent may be able to at least one of absorb, store and discharge at least one of the condensate and moisture to the charge air flow.

20 Claims, 1 Drawing Sheet

(51) Int. Cl.
   B01D 53/26 (2006.01)
   F02M 25/028 (2006.01)
   F28F 17/00 (2006.01)
   F28D 1/053 (2006.01)
   F28D 21/00 (2006.01)

(52) U.S. Cl.
   CPC ......... *F28F 2275/08* (2013.01); *Y02T 10/121* (2013.01); *Y02T 10/146* (2013.01)

(56) References Cited

U.S. PATENT DOCUMENTS

| | | | |
|---|---|---|---|
| 7,757,407 B2 * | 7/2010 | Vanderstraten | B01D 53/26 34/74 |
| 7,980,076 B2 | 7/2011 | Buia et al. | |
| 8,061,135 B2 | 11/2011 | Rutherford | |
| 9,038,607 B2 * | 5/2015 | Norman | F01P 1/00 123/41.02 |
| 2007/0295205 A1 * | 12/2007 | Vertriest | B01D 53/261 95/41 |
| 2010/0229549 A1 * | 9/2010 | Taylor | F02B 29/0468 60/599 |

FOREIGN PATENT DOCUMENTS

| | | |
|---|---|---|
| DE | 10234272 A1 | 2/2004 |
| DE | 102009011634 A1 | 11/2009 |
| DE | 102009042981 A1 | 4/2010 |
| DE | 102008045685 A1 | 9/2010 |
| DE | 102011102248 | 11/2012 |
| DE | 102011102248 A1 | 11/2012 |
| FR | 2959179 A1 | 11/2011 |
| RU | 2266484 * | 12/2005 |
| WO | WO-2007/120581 A1 | 10/2007 |
| WO | 2009/130083 | 10/2009 |

OTHER PUBLICATIONS

English Abstract of FR 2959779A1.
English Abstract of DE 102011102248.
English abstract for DE-3601391.
German Search Report for DE-102015209210.0, dated Jan. 11, 2016.
English abstract for DE-10234272.
English abstract for DE-102008045685.
English abstract for DE-102011102248.
English abstract for DE-20121112.

* cited by examiner

INTER COOLER

CROSS-REFERENCE TO RELATED APPLICATIONS

This application claims priority to German Patent Application No. 10 2015 209 210.0, filed May 20, 2015, the contents of which are hereby incorporated by reference in their entirety.

TECHNICAL FIELD

The present invention relates to an intercooler having an air outlet tank and having a condensate collector for collecting condensate which is separated, in particular, in the intercooler or for collecting moisture. Moreover, the invention relates to an internal combustion engine having an intercooler of this type.

BACKGROUND

DE 10 2009 042 981 A1 has disclosed an intercooler of the generic type having an air inlet tank and an air outlet tank and having a condensate collector for collecting condensate which is separated in the intercooler. Moreover, a condensate line is provided which is connected via an inlet to the condensate collector and via an outlet to an air intake manifold. By way of this, condensate extraction in a manner which is dependent on the differential pressure from the condensate collector is to be brought about during operation of the intercooler, as a result of which, in particular, previously used actuators, flaps and/or controllers can be dispensed with.

DE 10 2009 011 634 A1 has in turn disclosed an intercooler of the generic type, in which a condensate line continuously extracts condensate from the condensate collector as a reaction to a gradient which is generated by a throttle flap, if an engine is situated in the switched-on state.

DE 10 2008 045 685 A1 has disclosed an internal combustion engine arrangement having an internal combustion engine, a charge air compressor, a low pressure exhaust gas recirculation means, an intercooler and a charge air line. It is provided here that the intercooler has a closable condensate discharge opening at the lowest point, which condensate discharge opening is connected by way of a condensate discharge line to the charge air line. As a result, it is to be made possible to control a condensate discharge into the charge air line.

In general, depending on the environmental conditions (temperature and relative air humidity) and the present operating conditions, it can occur that condensate accrues in the intercooler; firstly preferably at low load and low boost pressure and secondly in the case of a low pressure exhaust gas recirculation application. As a result, an impairment of the charge air cooling operation can firstly occur, in particular at an ambient temperature below freezing point, at which the condensate which is collected can freeze. As a result, the passage of the charge air through the intercooler is blocked partially. Far more critical, however, is the volume expansion of the water when freezing, which can result in a burst pipe of the intercooler. The internal combustion engine can also be subject partially to irreparable damage as a result of the sudden entry of the entire, collected condensate into the said internal combustion engine.

For this reason, it is known from the prior art to avoid condensate in the intercooler or to discharge it from the intercooler, to which end, for example, flaps which are operated by means of actuators are provided for this purpose. Bypass lines around the intercooler are also known. In addition, it is known from the prior art to extract the condensate constantly and without additional actuators or flaps on account of a differential pressure between an air intake manifold and a condensate collector at the intercooler.

It is disadvantageous in the solutions which are known from the prior art, however, that they are either expensive and structurally complex, for example in the case of flaps which are controlled by means of actuators with an associated control logic means, are less effective, for example in the case of bypass lines or constantly open condensate discharge openings, via which a certain proportion of the charge air flow always escapes, or are even fragile, if the condensate is collected in external condensate collectors and can freeze there at correspondingly low exterior temperatures and can cause damage as a result.

SUMMARY

The present invention is therefore concerned with the problem of specifying an improved or at least an alternative embodiment for an intercooler of the generic type, which embodiment overcomes, in particular, the disadvantages which are known from the prior art.

According to the invention, this problem is solved by way of the subject matter of the independent claims. Advantageous embodiments are the subject matter of the dependent claims.

The present invention is based on the general concept of equipping at least one condensate collector in an intercooler having a drying agent which absorbs/stores condensate/moisture and arranging it in a region which is accessible to a charge air flow within the intercooler, as a result of which moisture can be absorbed and stored upstream of a heat exchanger block and condensate from the charge air flow can be absorbed and stored by the drying agent which is arranged in the condensate collector downstream of the said heat exchanger block, for example at low load and low boost pressure, and subsequently can output it again into the charge air flow at higher load and high boost pressure. To this end, the intercooler according to the invention has an air outlet tank and the abovementioned at least one condensate collector for collecting, in particular, condensate or moisture which is separated in the intercooler. It is conceivable here to arrange the condensate collector which is provided according to the invention downstream of the heat exchanger block in the charge air flow, the said condensate collector in this case actually collecting condensate, whereas, in the case of an arrangement which is selected upstream of the heat exchanger block, it can remove moisture from the charge air flow, with the result that no more condensate at all accrues or is separated in the heat exchanger block. The term "condensate collector" is therefore generally understood to mean a collector for absorbing, storing and discharging both moisture and liquid water, that is to say condensate. As a result of the arrangement of the condensate collector within the intercooler and at the same time in a region which is accessible to the charge air flow, it is therefore possible to bring about both the absorbing, and the collecting and discharging again of the condensate which accrues in the intercooler to the charge air flow within the intercooler, without further, separate components being required for this purpose, such as flaps, and associated actuators, actuating drives and the control logic means. The intercooler according to the invention can therefore be manufactured considerably less expensively, since it is structurally simpler, and in addition operates completely independently, without special control devices being required for this purpose. As a result of the omission of a discharge line or a bypass line, the intercooler according to the invention is also considerably improved with regard to its efficiency in comparison with intercoolers which are known from the prior art, in which, in the case of the presence of a discharge opening for the condensate, it could not be avoided that a certain proportion of the charge air flow always escaped via the discharge opening and could not be fed for combustion. In addition, acoustic disruptive noise which occurs under some circumstances also could not up to now be avoided completely in this region as a result of the absence or non-presence of a discharge opening of this type. Here, the drying agent which is arranged in the at least one condensate collector is capable without problems of absorbing and storing the condensate quantity or moisture quantity which accrues in many operating states of the intercooler, for example at low boost pressure and low load, until an operating state at higher load and higher boost pressure is reached, at which the charge air flow reaches a temperature which is so high that it can expel the condensate or the moisture stored in the drying agent from the latter again and can feed it via the charge air line for combustion in the internal combustion engine. The latter is achieved by virtue of the fact that the condensate collector is arranged within the intercooler in a region which is accessible to the charge air flow, that is to say is at least swept over by the charge air flow, and preferably is even flowed through at least partially by the said charge air flow. This can achieve a situation where the condensate or the moisture which is contained in the charge air flow can be stored reliably in the drying agent and can be subsequently expelled again from the drying agent by way of the charge air flow.

In one advantageous development of the solution according to the invention, the condensate collector is attached to the air outlet tank, in particular is welded, brazed, adhesively bonded, screwed or clipped. A positively locking connection is also conceivable. Even this non-exhaustive list allows it to be perceived what a wide variety of options there are available for fastening the condensate collector to the air outlet tank, to be precise both by means of releasable connections and by means of non-releasable connections. Moreover, in particular the screwing or clipping makes increased maintenance and repair ease possible, since the condensate collector can be released simply from the air outlet tank and, for example, a condensate discharge in the air outlet tank can be cleaned. In the same way, the condensate collector can be attached to the air inlet tank, in particular welded, brazed, adhesively bonded, screwed, clipped or attached via a positively locking connection. Here, the air outlet tank can be configured as a nozzle and/or the air inlet tank can be configured as a diffuser. Here, the condensate collector can be configured as a cast part, either as a metallic cast part, in particular as an aluminium cast part, or as a plastic injection-moulded part.

As an alternative to this, it goes without saying that it is also conceivable that the condensate collector is integrated into the air outlet tank or the air inlet tank and forms an integral constituent part of the air outlet tank/air inlet tank. This can take place, in particular, in the manner of a double floor below the air outlet tank or the intercooler. The size of the condensate collector depends here primarily on the quantity of condensate to be expected. As a result of the integration of the condensate collector into the air outlet tank/air inlet tank, mounting of the condensate collector on the air outlet tank/air inlet tank can be completely dispensed with, as a result of which these mounting costs are cancelled and the intercooler overall can be manufactured less expensively.

In one alternative embodiment of the solution according to the invention, clip elements which are configured integrally with the air inlet tank and/or the air outlet tank are arranged on the said air inlet tank and/or on the said air outlet tank, via which clip elements the at least one condensate collector is clipped to the air inlet tank or the air outlet tank. In the case of a configuration of the air inlet tank or the air outlet tank as a plastic injection-moulded part, in particular, the said clip elements can be manufactured in a structurally simple and inexpensive manner by way of a modified plastic injection mould. Clip elements of this type firstly permit simple mounting and secondly also permit in turn releasable mounting of the respective condensate collector on the air inlet tank and/or on the air outlet tank. It goes without saying that a type of rail can also be provided in an analogous manner on the air inlet tank and/or on the air outlet tank, into which rail the condensate collector can be pushed and by way of which rail the condensate collector can be held reliably during operation of the intercooler. It goes without saying that it is conceivable here that, in the intercooler according to the invention, merely one condensate collector is arranged in the air inlet tank or in the air outlet tank, or else that in each case one condensate collector is arranged both in the air inlet tank and in the air outlet tank. In the air inlet tank, the condensate collector or its drying agent serves here to absorb the moisture which is contained in the charge air flow, as a result of which separation of condensate, that is to say liquid water, can no longer occur in the following heat exchanger block. If the condensate collector is arranged downstream of the heat exchanger block in the region of the air outlet tank, it goes without saying that condensation of the moisture which is contained in the charge air flow can occur in the region of the heat exchanger block, with the result that condensate is actually separated in the condensate collector in this case. It is also conceivable purely theoretically that a respectively smaller condensate collector is arranged for example both in the air inlet tank and in the air outlet tank, which condensate collectors in each case have a lower flow resistance than one large condensate collector which is arranged only on one side in comparison with this, as a result of which the flow resistance within the intercooler can be reduced.

In one advantageous development of the solution according to the invention, the drying agent has a molecular sieve and/or a granulate with bentonite and/or silica gel. Natural and synthetic zeolites or other materials which have a high adsorption capacity for molecules of different sizes are usually understood to be a molecular sieve. As a result of a suitable selection of the molecular sieve, it is possible here to separate molecules of different sizes. It goes without saying that silica gel or bentonite can also be used in the same way, in which the water vapour or the condensate accumulates and condenses there. Silica gel, for example, is an amorphous silicon dioxide of gel-like, rubber-like to solid consistency and has a large inner surface area which makes it greatly hygroscopic. Bentonite in turn is a mixture of different clay minerals which likewise have a pronounced water absorption capability. Both the molecular sieve and silica gel or bentonite or in general silica gels make regeneration by way of drying possible.

Furthermore, the present invention is based on the general concept of equipping an internal combustion engine with an above-described intercooler of this type. An internal combustion engine which is equipped in this way and can be arranged, for example, in a motor vehicle affords the great advantage of functioning reliably and without disruption, in particular in the area of the intercooler, since all problems which have been known up to now from the prior art and could occur in relation to the respective intercooler can be avoided by way of the intercooler according to the invention.

Further important features and advantages of the invention result from the subclaims, from the drawings and from the associated description of the figures using the drawings.

It goes without saying that the features which are mentioned in the above text and the features which are still to be explained in the following text can be used not only in the respectively specified combination, but rather also in other combinations or on their own, without departing from the scope of the present invention.

Preferred exemplary embodiments of the invention are shown in the drawings and will be explained in greater detail in the following description, identical reference numerals relating to identical or similar or functionally identical components.

DETAILED DESCRIPTION

Figure 1:
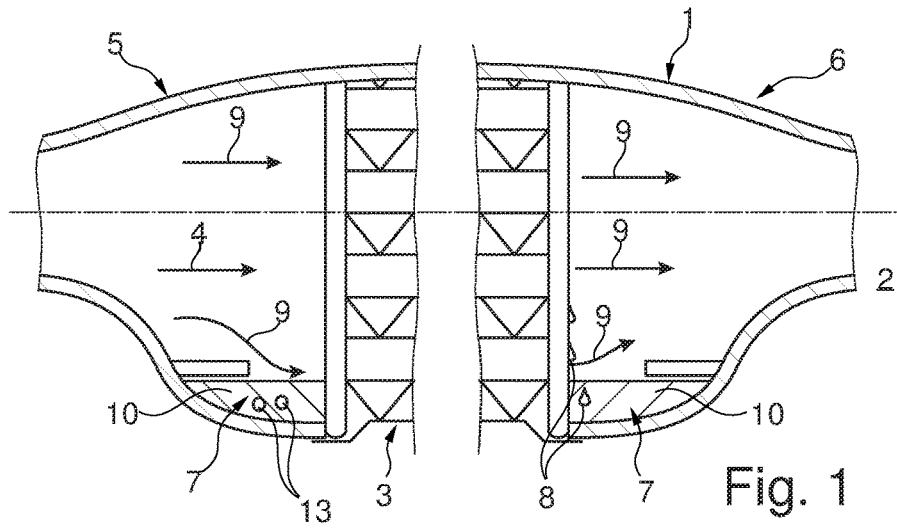
FIG. 1 shows a longitudinal sectional illustration of an intercooler according to the invention in the case of a first embodiment of a condensate collector.
Figure 2:
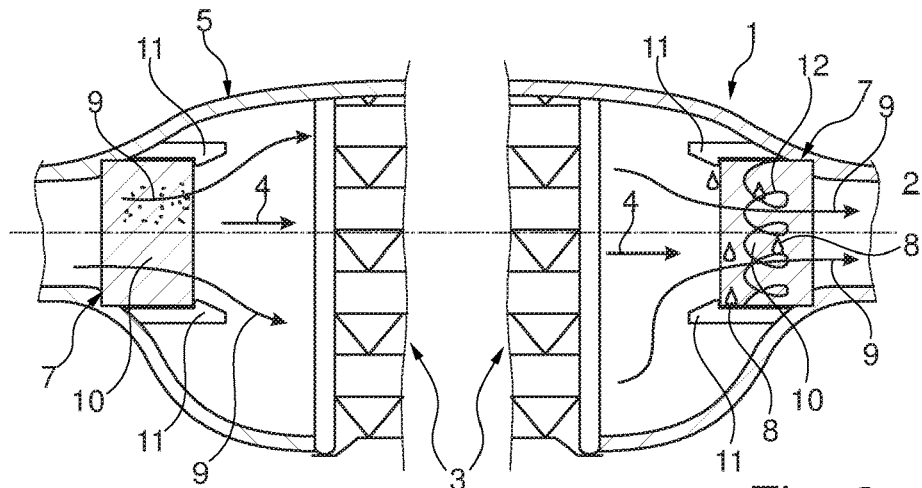
FIG. 2 shows an illustration as in FIG. 1, but in the case of a second embodiment of the condensate collector.
Figure 3:
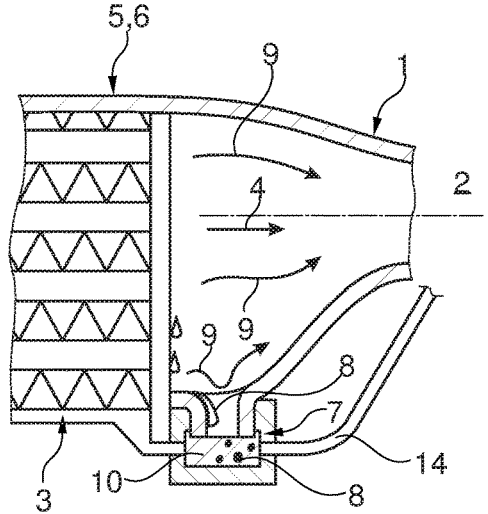
FIG. 3 shows a sectional illustration through an intercooler having an attached condensate collector.

According to FIGS. 1 to 3, an intercooler 1 according to the invention of an internal combustion engine 2 which is otherwise merely indicated has a heat exchanger block 3, an air inlet tank 5 which is situated upstream in the flow direction 4, and an air outlet tank 6 which is arranged downstream of the heat exchanger block 3 in the flow direction 4. Here, according to FIGS. 1 and 2, the intercooler 1 is not shown completely in the middle in the region of the heat exchanger block 3, whereas the intercooler 1 is shown merely in the region of the heat exchanger block 3 and the air outlet tank 6 which is situated downstream thereof in FIG. 3. Moreover, the intercooler 1 has at least one condensate collector 7 for collecting condensate 8 which is separated, in particular, in the intercooler 1 or moisture which is separated from charge air 9. It is clear here that the condensate collector 7 is capable in general of absorbing, in particular adsorbing, storing and discharging liquid water again, that is to say condensate 8, and is likewise capable of absorbing, storing and discharging gaseous water again, that is to say moisture. Here, the intercooler 1 according to the invention has at least one condensate collector 7 of this type which can be arranged upstream of the heat exchanger block 3 or downstream thereof. In the case of the selected arrangement upstream of the heat exchanger block 3, the condensate collector 7 collects the moisture which is contained in a charge air flow 9 and, as a result, prevents or at least minimizes the condensate formation which usually takes place in the heat exchanger block 3. If the condensate collector 7 is arranged downstream of the heat exchanger block 3, it serves for collecting, storing and discharging again the liquid water, that is to say condensate 8, which is formed, in particular, in the heat exchanger block 3. It goes without saying that it is also conceivable that in each case one condensate collector 7 of this type is arranged both upstream and downstream of the heat exchanger block 3, as is shown, for example, in the case of the intercoolers 1 according to FIGS. 1 and 2.

According to the invention, the condensate collector 7 is then arranged in a region of the intercooler 1 which is accessible to the charge air flow 9, for example within the intercooler 1 (cf. FIGS. 1 and 2) or else attached to the latter (see FIG. 3). Here, a drying agent 10, for example a molecular sieve and/or a granulate with bentonite or silica gel, is arranged in the at least one condensate collector 7. Here, the said drying agent 10 is capable of absorbing, holding and discharging moisture and/or condensate 8 to the charge air flow 9 again. If the intercooler 1 according to the invention is operated, for example, at low load and low boost pressure, condensation of water vapour can occur in the heat exchanger block 3, which condensation can then be stored in the condensate collector 7 which is arranged downstream, until the boost pressure and therefore also the temperature of the charge air flow 9 rise again to such an extent that the water which is stored in the condensate collector 7 or in the drying agent 10 thereof can be expelled therefrom on account of the charge air flow 9. Redrying of the drying agent 10 therefore takes place.

If, for example, FIG. 1 is considered, it can be seen that the condensate collector 7 forms an integral constituent part of the air outlet tank 6 and/or the air inlet tank 5. Here, the condensate collectors 7 are arranged in such a way that the charge air flow 9 sweeps over them, or even flows through them at least partially or completely, as is the case in the condensate collectors 7 which are shown according to FIG. 2 and are integrated in each case into the air inlet tank 5 and the air outlet tank 6.

If FIG. 2 is considered, it can be seen that clip elements 11 which are configured integrally with the air inlet tank 5 and the air outlet tank 6 are arranged on the said air inlet tank 5 and on the said air outlet tank 6, by which clip elements 11 the at least one condensate collector 7 (here, both condensate collectors 7) is/are clipped to the air inlet tank 5 and/or the air outlet tank 6. Moreover, the air inlet tank 5 is usually configured as a diffuser and the air outlet tank 6 is usually configured as a nozzle.

Here, it goes without saying that a common feature of all embodiments is that at least one condensate collector 7 is provided which is arranged upstream or downstream of the heat exchanger block 3 and, in accordance with the respective arrangement, is configured either for absorbing, storing and discharging moisture (arrangement upstream of the heat exchanger block 3) or else for absorbing, storing and discharging condensate (arrangement downstream of the heat exchanger block 3). It goes without saying that condensate collectors 7 can also be arranged on both sides of the heat exchanger block 3. If the embodiment of the intercooler according to the invention in accordance with FIG. 3 is considered, it can be seen that the condensate collector 7 is attached to the air outlet tank 6, in particular is welded, brazed, adhesively bonded, screwed or clipped to the latter. In the same way, but not shown, a condensate collector 7 of this type can be attached to the air inlet tank 5. It goes without saying that an attachment of this type also ensures that the drying agent 10 in the condensate collector 7 is flowed over by the charge air flow 9 and can be dried at correspondingly high temperatures.

Here, the air outlet tank 6 and/or the condensate collector 7 can be configured as a cast part, either as a metallic cast part, in particular as an aluminium cast part, or as a plastic injection-moulded part.

It is therefore possible by way of the intercooler 1 according to the invention to bring about requirement-dependent drying of the charge air or the charge air flow 9 and in the process to store the moisture or the condensate 8 in the drying agent 10 of the condensate collector 7 until the temperature of the charge air flow 9 permits redrying of the drying agent 10 and in the process removes the moisture or the condensate 8 from the drying agent 10 again and feeds it for combustion in the internal combustion engine 2.

In comparison with intercoolers which are known from the prior art, no complicated control electronics, no additional flaps, no discharge openings and also no bypass line have to be provided for this purpose here, however, as a result of which not only can the operation of the intercooler 1 according to the invention be of more reliable and operationally secure design, but rather the said intercooler 1 overall can also be manufactured less expensively.

If the drying agent 10 has absorbed condensate 8 or is saturated with condensate 8, it has to be regenerated again. In order to regenerate or to heat the drying agent 10, various options are in general conceivable:

1) Heating by means of electrical energy: the drying agent 10 can be heated and regenerated simply with the aid of an electric heating device 12, in particular a heating coil or the like, as is shown by way of example with a dashed line in FIG. 2.
2) Heating with warm cooling water: as an alternative, the drying agent 10 can also be heated with coolant which is removed from the engine cooling circuit. To this end, the drying agent 10 can be penetrated by coolant ducts 13 (cf. FIG. 1), through which hot coolant flows.
3) Heating with charge air: a further variant would be to conduct charge air via a small bypass pipe 14 to the condensate collector 7 and to blow the warm charge air into the drying agent 10 or to conduct it through the said drying agent 10 (see FIG. 3).

Depending on the operating point, the energy of the charge air or the charge air flow 9 can be sufficient at high charge air temperatures, in order to evaporate the condensate 8.

The drying agent 10 can therefore be dried and regenerated by virtue of the fact that an electric heating device (12), in particular a heating coil, heats the drying agent (10), and/or hot coolant for regenerating the drying agent (10) is conducted through at least one coolant duct (13) which runs through the drying agent (10), and/or warm charge air is conducted through a bypass pipe (14) to the condensate collector (7) and through the latter and is blown into the drying agent (10).

It goes without saying here that the individual drying processes can be used alternatively or cumulatively and, in particular, can be used in a manner which is dependent on a respective load state of the internal combustion engine 2.

The invention claimed is:

1. An intercooler comprising:
   an air outlet tank;
   at least one condensate collector for collecting at least one of condensate, which is separated in the intercooler, and moisture;
   a drying agent arranged in the at least one condensate collector; and
   at least one of:
      at least one coolant duct running through the drying agent, and through which hot coolant flows for regenerating the drying agent; and
      a bypass pipe leading to the condensate collector and through which warm charge air is able to be blown into the drying agent;
   wherein the at least one condensate collector is arranged in a region of the intercooler accessible to a charge air flow; and
   wherein the drying agent is able to at least one of absorb, store and discharge at least one of the condensate and the moisture to the charge air flow.

2. An intercooler according to claim 1, wherein the at least one condensate collector is attached to at least one of the air outlet tank and an air inlet tank.

3. An intercooler according to claim 2, wherein
   the at least one condensate collector is at least one of welded, brazed, adhesively bonded, screwed, or clipped to at least one of the air outlet tank and
   the air inlet tank.

4. An intercooler according to claim 1, wherein
   the at least one condensate collector forms an integral constituent part of one of the air outlet tank or
   an air inlet tank.

5. An intercooler according to claim 1, wherein the at least one condensate collector is arranged in such a way that a charge air flow at least one of sweeps over the at least one condensate collector and flows through the at least one condensate collector at least partially.

6. An intercooler according to claim 2, further comprising at least one clip element arranged on at least one of the air inlet tank and the air outlet tank, the at least one clip element configured to clip the at least one condensate collector to at least one of the air inlet tank and the air outlet tank.

7. An intercooler according to claim 1, wherein the drying agent has at least one of a molecular sieve and a granulate with at least one of bentonite and silica gel.

8. An intercooler according to claim 1, wherein at least one of:
   the air outlet tank is configured as a nozzle; and
   an air inlet tank is configured as a diffuser.

9. An intercooler according to claim 1, wherein at least one of the air outlet tank and the at least one condensate collector is configured as one of a metallic cast part or a plastic injection-moulded part.

10. An intercooler according to claim 1, further comprising:
    an electric heating device for regenerating the drying agent.

11. An internal combustion engine comprising an intercooler having:
    an air outlet tank;
    an air inlet tank;
    at least one condensate collector for collecting at least one of condensate, which is separated in the intercooler, and moisture, the at least one condensate collector being attached to at least one of the air outlet tank and an air inlet tank;
    a drying agent arranged in the at least one condensate collector; and
    at least one clip element arranged on at least one of the air inlet tank and the air outlet tank, the at least one clip element configured to clip the at least one condensate collector to at least one of the air inlet tank and the air outlet tank;
    wherein the at least one condensate collector is arranged in a region of the intercooler accessible to a charge air flow; and wherein the drying agent is able to at least one of absorb, store and discharge at least one of the condensate and the moisture to the charge air flow.

12. A method for regenerating a drying agent in an intercooler, comprising at least one of:
    conducting hot coolant through at least one coolant duct running through the drying agent; and
    conducting warm charge air through a bypass pipe to at least one condensate collector of the intercooler and blowing the warm charge air into the drying agent.

13. An intercooler according to 3, further comprising at least one clip element arranged on at least one of the air inlet tank and the air outlet tank, the at least one clip element configured to clip the at least one condensate collector to at least one of the air inlet tank and the air outlet tank.

14. An intercooler according to claim 3, wherein the drying agent has at least one of a molecular sieve and a granulate with at least one of bentonite and silica gel.

15. An intercooler according to claim to 3, wherein at least one of:
    the air outlet tank is configured as a nozzle; and
    the air inlet tank is configured as a diffuser.

16. An intercooler according to claim 3, wherein at least one of the air outlet tank and the at least one condensate collector is configured as one of a metallic cast part or a plastic injection-moulded part.

17. An intercooler according to claim 3, further comprising:
    an electric heating device for regenerating the drying agent.

18. An intercooler according to 4, further comprising at least one clip element arranged on at least one of the air inlet tank and the air outlet tank, the at least one clip element configured to clip the at least one condensate collector to at least one of the air inlet tank and the air outlet tank.

19. An intercooler according to claim to 4, wherein at least one of:
    the air outlet tank is configured as a nozzle; and
    the air inlet tank is configured as a diffuser.

20. An intercooler according to claim 4, further comprising:
    an electric heating device for regenerating the drying agent.

* * * * *